(12) United States Patent
Bae et al.

(10) Patent No.: US 7,219,028 B2
(45) Date of Patent: May 15, 2007

(54) APPARATUS FOR TESTING HARD DISK DRIVE

(75) Inventors: Min-won Bae, Gumi-si (KR); Sung-uk Moon, Gumi-si (KR); Jeong-cheol Choi, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 125 days.

(21) Appl. No.: 10/845,115

(22) Filed: May 14, 2004

(65) Prior Publication Data

US 2005/0010836 A1 Jan. 13, 2005

(30) Foreign Application Priority Data

May 15, 2003 (KR) .................... 10-2003-0030895

(51) Int. Cl.
*G01M 19/00* (2006.01)
(52) U.S. Cl. ......................... 702/115; 710/38
(58) Field of Classification Search ........ 702/117–118, 702/120, 122, 182–183; 710/36, 38
See application file for complete search history.

(56) References Cited

U.S. PATENT DOCUMENTS

| | | | |
|---|---|---|---|
| 4,866,667 A | 9/1989 | Shimada | 710/316 |
| 4,888,549 A | 12/1989 | Wilson et al. | 324/73.1 |
| 5,214,785 A | 5/1993 | Fairweather | 710/67 |
| 5,442,305 A * | 8/1995 | Martin et al. | 326/30 |
| 5,619,722 A | 4/1997 | Lovrenich | 710/2 |
| 5,644,705 A | 7/1997 | Stanley | 714/42 |
| 5,819,112 A | 10/1998 | Kusters | 710/36 |
| 5,835,703 A | 11/1998 | Konno | 714/42 |
| 5,875,293 A * | 2/1999 | Bell et al. | 714/27 |

(Continued)

FOREIGN PATENT DOCUMENTS

JP 60-005646 1/1985

(Continued)

OTHER PUBLICATIONS

Notice of Office Action issued by Korean Patent Office on Nov. 30, 2004 in a corresponding Korean patent application of the present above-identified US patent application (2 pages), including English language translation thereof (2 pages).

(Continued)

*Primary Examiner*—Marc S. Hoff
*Assistant Examiner*—Mary Catherine Baran
(74) *Attorney, Agent, or Firm*—Staas & Halsey LLP

(57) ABSTRACT

A device testing apparatus, such as a hard disk drive (HDD) testing apparatus, using one host computer to test a plurality of the devices, such as to burn-in test HDDs. A host computer having at least two serial communication ports is communicably connected to power cards which supply operating power to each HDD to be tested. A serial communication exchanger is communicably connected to the serial communication ports of the host computer and to the HDDs, and responds to channel selection instructions issued by the host computer to selectively establish a serial communication channel among HDDs, the power card, and the host computer. The single host computer conducts the testing of the HDDs by communicating with the HDDs via the established serial communication channel.

20 Claims, 8 Drawing Sheets

U.S. PATENT DOCUMENTS

| | | | | |
|---|---|---|---|---|
| 5,903,572 A * | 5/1999 | Wright et al. | | 370/524 |
| 6,035,345 A | 3/2000 | Lee | | 710/8 |
| 6,169,413 B1 | 1/2001 | Paek et al. | | 324/760 |
| 6,208,477 B1 | 3/2001 | Cloke et al. | | 360/31 |
| 6,317,798 B1 * | 11/2001 | Graf | | 710/15 |
| 6,434,498 B1 | 8/2002 | Ulrich et al. | | 702/115 |
| 6,434,499 B1 | 8/2002 | Ulrich et al. | | 702/115 |
| 6,516,053 B1 * | 2/2003 | Ryan et al. | | 379/21 |
| 6,806,700 B2 | 10/2004 | Wanek et al. | | 324/158.1 |
| 6,850,994 B2 | 2/2005 | Gabryjelski | | 710/19 |
| 6,952,789 B1 | 10/2005 | Azim et al. | | 713/400 |
| 6,971,084 B2 | 11/2005 | Grey et al. | | 717/106 |

FOREIGN PATENT DOCUMENTS

| | | |
|---|---|---|
| JP | 63-9337 | 1/1988 |
| JP | 1-222549 | 9/1989 |
| JP | 3-209601 | 9/1991 |
| JP | 8-298689 | 11/1996 |
| JP | 2000-215116 | 8/2000 |
| JP | 2002-21555 | 8/2002 |
| KR | 1997-7634 | 2/1997 |
| KR | 1997-76738 | 12/1997 |
| KR | 1998-35445 | 8/1998 |
| KR | 1998-47465 | 9/1998 |
| KR | 1998-31599 | 7/1999 |
| KR | 1999-60610 | 7/1999 |
| KR | 1999-60619 | 7/1999 |
| KR | 1999-65516 | 8/1999 |
| KR | 1999-70583 | 9/1999 |
| KR | 2000-12526 | 7/2000 |
| KR | 2001-0049089 | 6/2001 |
| KR | 2001-49089 | 6/2001 |

OTHER PUBLICATIONS

U.S. Appl. No. 10/845,152, filed May 14, 2004, Chang-ick Shin, Samsung Electronics Co., Ltd., Suwon-si, Republic of Korea.

U.S. Appl. No. 10/845,116, filed May 14, 2004, Sung-uk Moon et al., Samsung Electronics Co., Ltd., Suwon-si, Republic of Korea.

Notice of Office Action issued by Korean Patent Office on Nov. 30, 2004 in Korean patent application No. 10-2003-0030895 related to the present above-identified US patent application (2 pages), including English language translation thereof (2 pages).

Notice of Office Action issued by Korean Patent Office on Feb. 22, 2005 in Korean patent application No. 10-2003-0030894 related to the present above-identified US patent application (2 pages), including English language translation thereof (2 pages).

Mark Nelson, "Serial Communications Developer's Guide", 2$^{nd}$ Edition, 5 pages (copyrighted material).

* cited by examiner

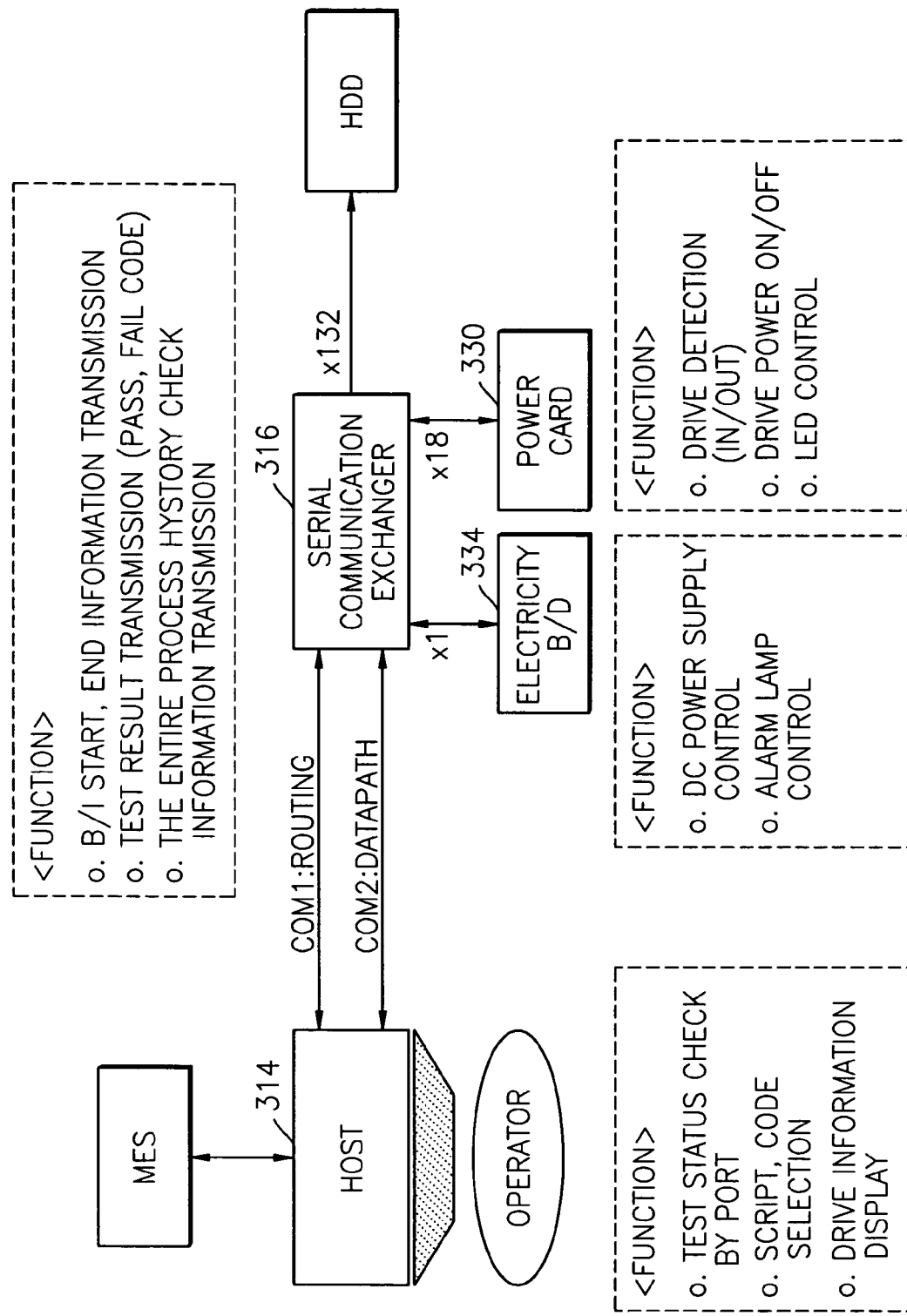

APPARATUS FOR TESTING HARD DISK DRIVE

CROSS-REFERENCE TO RELATED APPLICATIONS

This application claims priority benefit from Korean Patent Application No. 2003-30895, filed on May 15, 2003, in the Korean Intellectual Property Office, the disclosure of which is incorporated herein in its entirety by reference.

BACKGROUND OF THE INVENTION

1. Field of the Invention

The present invention relates to an apparatus for testing a hard disk drive in a test process performed in the manufacture of hard disk drives, and more particularly, to a hard disk drive testing apparatus that employs only one host computer to test a plurality of hard disk drives in a burn-in (B/I) test process.

2. Description of the Related Art

As is generally known, a hard disk drive (HDD) combines and includes a head disk assembly (HDA) made up of mechanical components, and a printed circuit board assembly (PCBA) made up of circuit components. An HDD is generally used as a complementary memory device in which a head hovers a minute distance above a turning magnetic disk, data is magnetically recorded on or read from the disk, and a large volume of data can be accessed at a high speed.

HDDs are generally manufactured through a mechanical assembly process, a servo write process, a function test process, and a burn-in test process, and are then put through a post process, which is like a final test process to confirm whether an HDD set that passed the burn-in test process was normally settled with defect processing. A process of manufacturing an HDD will now be described in detail. First, the mechanical assembly process is a process of assembling an HDA from mechanical components, and is usually performed in a clean room. The servo write process, performed second, is a process of recording a servo write pattern for servo control of an actuator on a disk, and is usually performed by a servo writer. The function test process, performed third, combines the HDA produced in the mechanical assembly process with the PCBA, and tests whether they match properly and operate together normally. In the function test process, the combination of the HDA and the PCBA is combined with a specific test system and put through a basic test for about 20 to 25 minutes. The burn-in test process, performed fourth, is the process that takes the longest time (usually 8 through 16 hours) in the manufacture of an HDD. In the burn-in test process, any defects on the disk are found and corrected.

The final post test process, performed fifth, is a process to confirm whether an HDD set which passed the above-described burn-in test process was normally settled with defect processing, and tests the defect processing status of every HDD set using the specific test system. The final test process connects each HDD to a separate test computer and performs tests. Each test computer is connected to a host computer over a local area network (LAN), tests a connected HDD according to a test program, and outputs the results to the host computer. The host computer displays status data input from each test computer on a display unit, and workers decide success or failure while monitoring the status data. HDDs that pass the final test process are shipped as finished products through a shipment test process, a packing and shipping process, etc.

Since, as described above, the burn-in test process takes the longest time in manufacturing an HDD, a burn-in testing apparatus is needed which can reliably test as many HDDs as possible in a limited time and in a limited space. Conventional testing apparatuses are disclosed in Korean Patent Publication No. 1997-76738 (Dec. 12, 1997), Korean Patent Publication No. 1998-35445 (Aug. 5, 1998), Korean Patent Publication No. 1999-60619 (Jul. 26, 1999), Korean Patent Publication No. 1999-65516 (Aug. 5, 1999), U.S. Pat. No. 6,434,498 (Aug. 13, 2002), U.S. Pat. No. 6,208,477 (Mar. 27, 2001) and U.S. Pat. No. 6,434,499 (Aug. 13, 2002).

FIG. 1 shows the exterior of a conventional hard disk drive testing apparatus disclosed in Korean Patent Publication 1997-76738, filed by Samsung Electronics Co., Ltd., assignee of the present application. Referring to FIG. 1, a burn-in chamber 30 where HDDs are stacked is located in the front, and a control chamber 40, which is made up of lined-up power cards, is located in the rear of the HDD testing apparatus 200 and separated from the control chamber 30 by a partition 80. The power cards control the supply of power to each HDD stacked in the burn-in chamber 30, and to 20 to 24 test computers 50. Typically, each test computer 50 controls and monitors (tests) 6 HDDs.

A power distribution unit installed at an end of the control chamber 40 distributes power to the power cards and a host computer which manages the test computers 50 and receives input/output instructions from a manager. Meanwhile, a DC power supply installed at the other end of the control chamber 40 supplies power to the HDDs to be tested. Also, a display unit and a keyboard (not shown) are attached at one end of the burn-in chamber 30 for user interface, and heaters & blowers are installed at both ends of the burn-in chamber for keeping a high temperature in the burn-in chamber 30.

FIG. 2 is a block diagram which shows the internal configuration of the apparatus shown in FIG. 1. Referring to FIG. 2, for the HDD test apparatus 200 shown in FIG. 1, one host computer 600 and 20 to 24 test computers 612–618 are connected through a first control bus 660, and three dual channel IDE adapters 622, 624, and 626 are also connected to each test computer 612–618 through a second control bus 630. Also, two HDDs (pairs of 642–644, 646–648, and 650–652) are connected to each dual channel IDE adapter 622, 624, and 626, respectively.

After booting the host computer 600, the host computer 600 sets up a communication network with the test computers 612–618 through the first control bus 660, which may be embodied as a typical LAN or as some other type of connection. The test computers 612–618 are booted through the first control bus 660 to execute the test program and form a communication channel between the test computers 612–618 and the host computer 600. When the communication channel between the test computers 612–618 and the host computer 600 is formed, the host computer 600 receives status information from each test computer 612–618, displays the status on the screen of the display unit, and controls the temperature inside the burn-in chamber 30 using the heaters and blowers.

When HDDs to be tested are inserted into the burn-in chamber 30 of the HDD testing apparatus 200, the test computers 612–618 detect the HDD, for example, the HDD 652, insertion and upload a test code and script to the HDD 652 via the dual channel IDE adapter 626. After this, the test computers 612–618 monitor the test results or the progress status through the IDE interface and transfer the data to the host computer 600, which then displays the test results or progress status on the screen of the display unit.

The conventional testing apparatus 200 shown in FIGS. 1 and 2 has a structure which connects each test computer to 6 HDDs, and thus is more efficient than prior 1 to 1 test methods. However, the testing apparatus 200 shown in FIGS. 1 and 2 still requires 20 to 24 test computers. These test computers require a control chamber 40 of considerable size to house them. Also, because 3 expensive dual IDE adapters per test computer need to be installed, the testing apparatus 200 shown in FIGS. 1 and 2 is not significantly cheaper to build and implement than prior 1 to 1 test apparatuses. Also, there is a significant possibility of error generation, because, as shown in FIG. 2, the host computer 600 is connected to the test computers 612–618 through a three tier complex communication structure (i.e., the typical communication structure connecting one computer to another computer), and each of the test computers 612–618 again control the HDDs via another communication structure, which is the dual IDE adapters. Accordingly, because of the complex communication structure, it is also difficult to debug the system when an error occurs. Moreover, if the interface standard of the HDDs is changed, all IDE adapters must be replaced and the test program loaded in the test computers 612–618 must be modified.

SUMMARY OF THE INVENTION

The present invention provides an HDD testing apparatus testing a plurality of HDDs with one host computer.

Additional aspects and/or advantages of the invention will be set forth in part in the description which follows and, in part, will be obvious from the description, or may be learned by practice of the invention.

The present invention may be achieved by an HDD testing apparatus comprising a host computer having at least two serial communication ports; a power card which selectively supplies operating power to each of a plurality of HDDs to be tested; and a serial communication exchanger which is connected to the serial communication ports of the host computer, responds to channel selection instructions issued by the host computer, and selectively establishes a serial communication channel among the HDDs, the power card, and the host computer. Therefore, the host computer conducts the testing of the HDDs by communicating with the HDDs via the two serial communication channels of the host computer.

BRIEF DESCRIPTION OF THE DRAWINGS

The above and/or other features and advantages of the present invention will become more apparent by describing in detail an exemplary embodiment thereof with reference to the attached drawings in which:

FIG. 8 is a functional block diagram of a hard disk drive testing apparatus, according to an embodiment of the present invention.

DETAILED DESCRIPTION OF THE PREFERRED EMBODIMENTS

Figure 1:
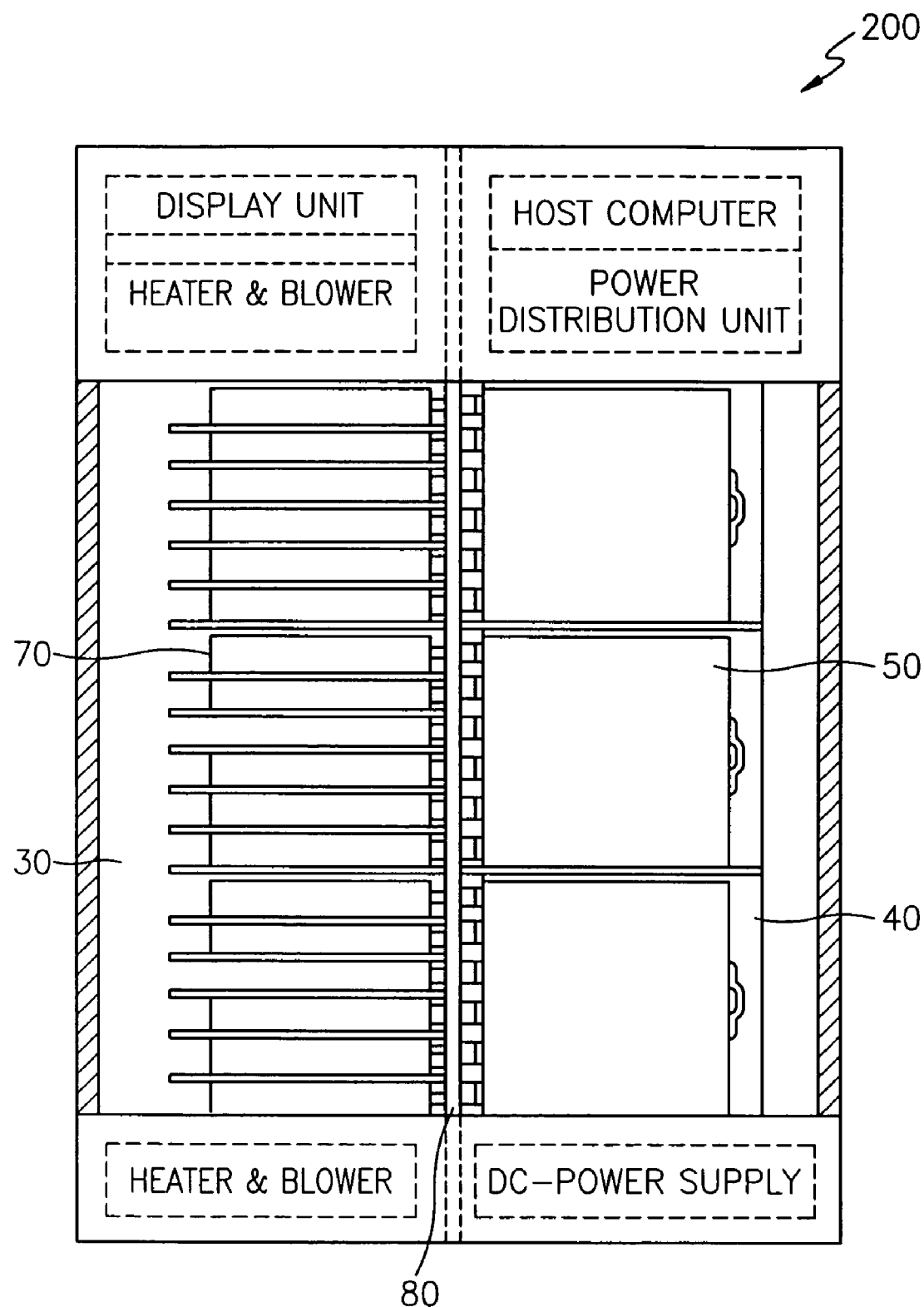
FIG. 1 shows the exterior of a conventional hard disk drive testing apparatus.
Figure 2:
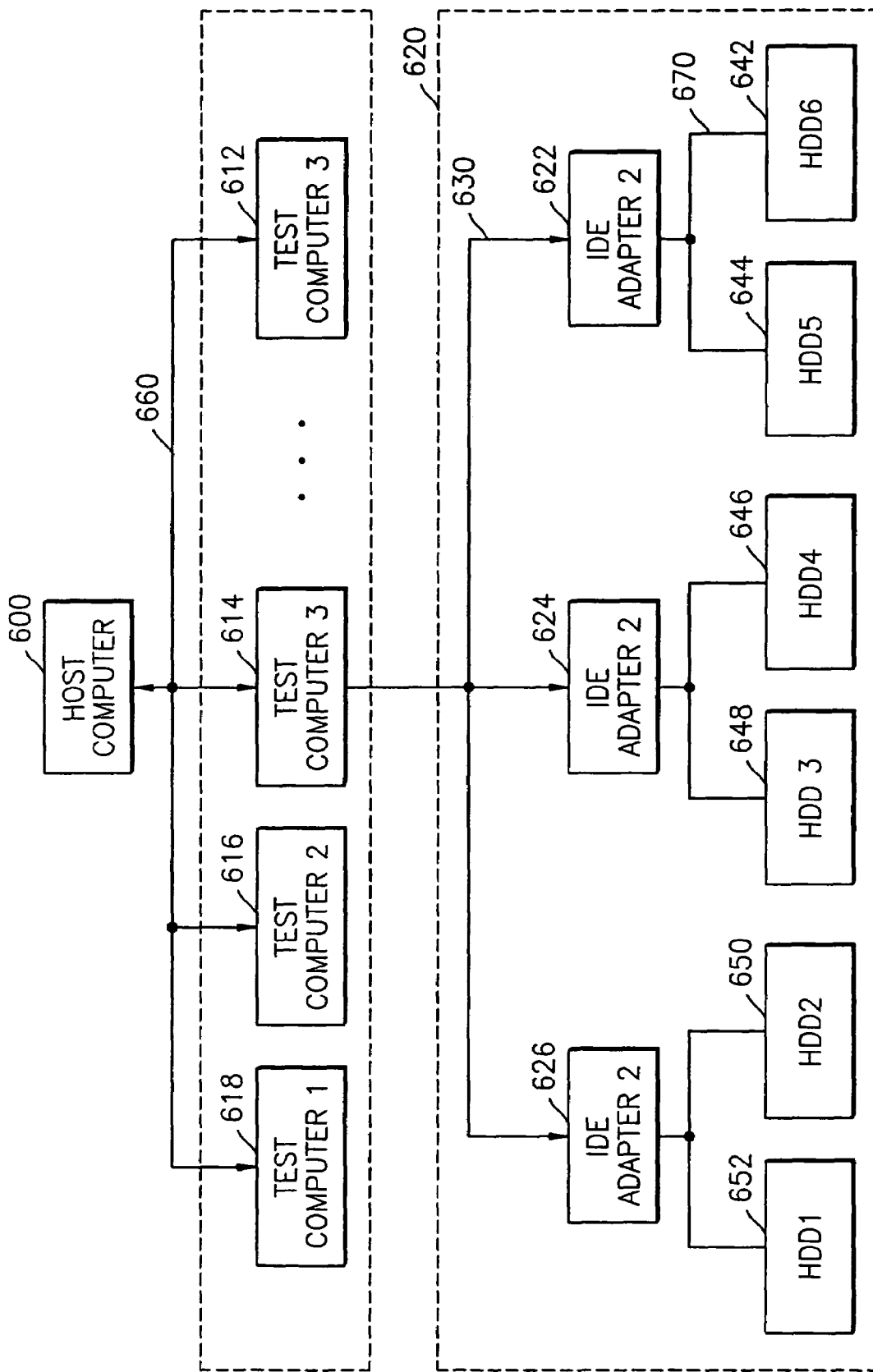
FIG. 2 is a functional block diagram showing the internal configuration of the conventional hard disk drive testing apparatus shown in FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures. For the sake of clarity and concision, technology that is not novel and is well known in the art to which the present invention pertains will not be described herein.

A hard disk drive testing apparatus of the present invention uses one host computer and a serial communication channel exchanger to test a plurality of HDDs, thereby reducing equipment cost and making more efficient use of space. Also, by excluding the conventional heating system, combining two testing apparatuses into one double-sided apparatus, expels heat from the HDDs themselves using a fan, and testing the HDDs at a normal room temperature, equipment cost is further reduced and space is used even more efficiently. Moreover, by using a serial communication channel for communication between the HDD testing apparatus and the HDDs, communication reliability is improved, because of a simplified and more reliable communication structure between thereto, and it is possible to test HDDs with different interface standards in the same testing apparatus. Furthermore, due to its simple structure, the HDD testing apparatus according to the present invention is easy to perform maintenance on. The serial communication channel exchanger (serial communication switching device) used by the present invention is disclosed in the related Korean Patent Application No. 2003-30894 filed May 15, 2003 by Samsung Electronics Co., Ltd., assignee of the present Application, and also disclosed in a co-pending US patent application filed by Samsung Electronics Co., Ltd., assignee of the present Application, on May 14, 2004 in the US Patent and Trademark Office and having an, the entire contents of which are hereby incorporated by reference.

Figure 3:
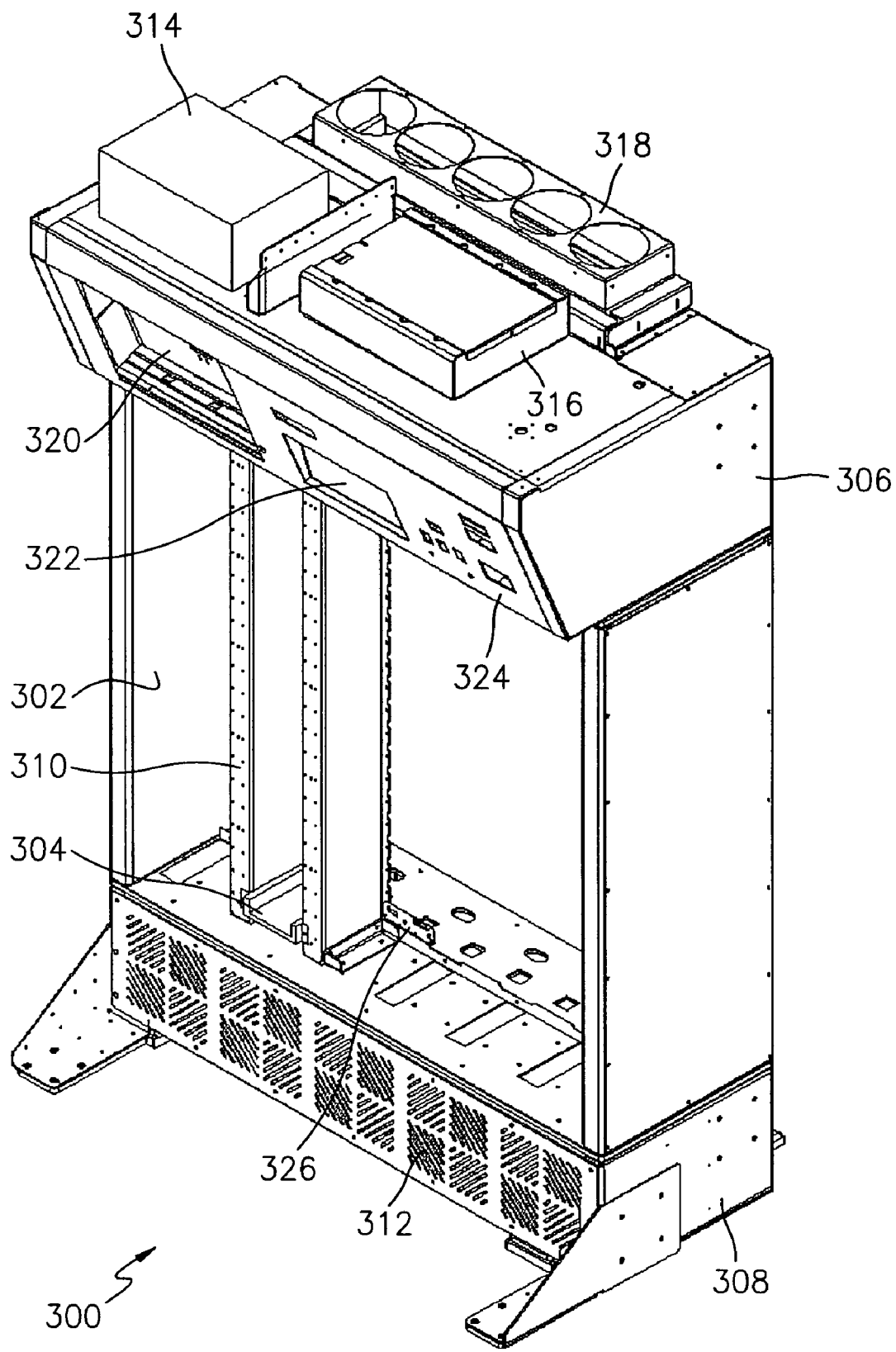
FIG. 3 is a perspective view of a hard disk drive testing apparatus, according to an embodiment of the present invention.
Figure 4:
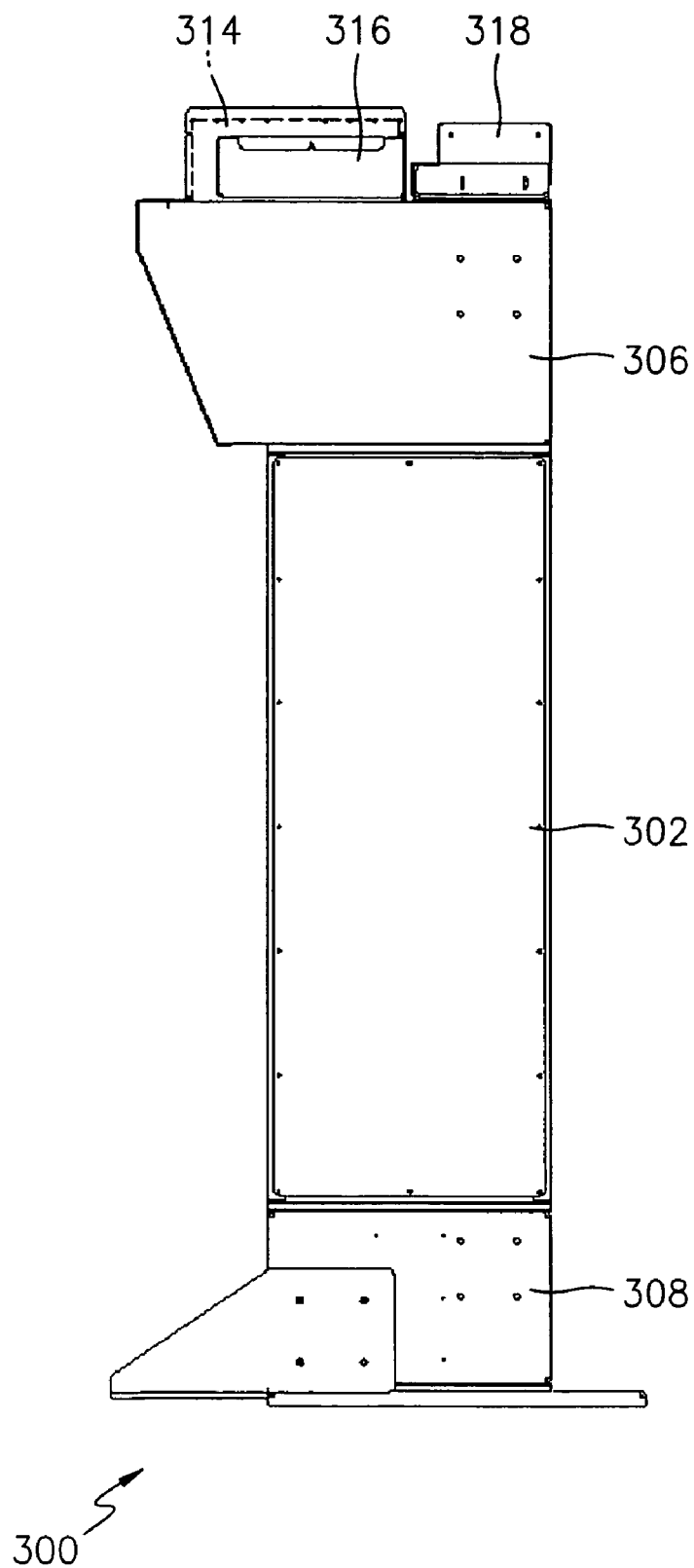
FIG. 4 is a side view of the hard disk drive testing apparatus shown in FIG. 3.
Figure 5:
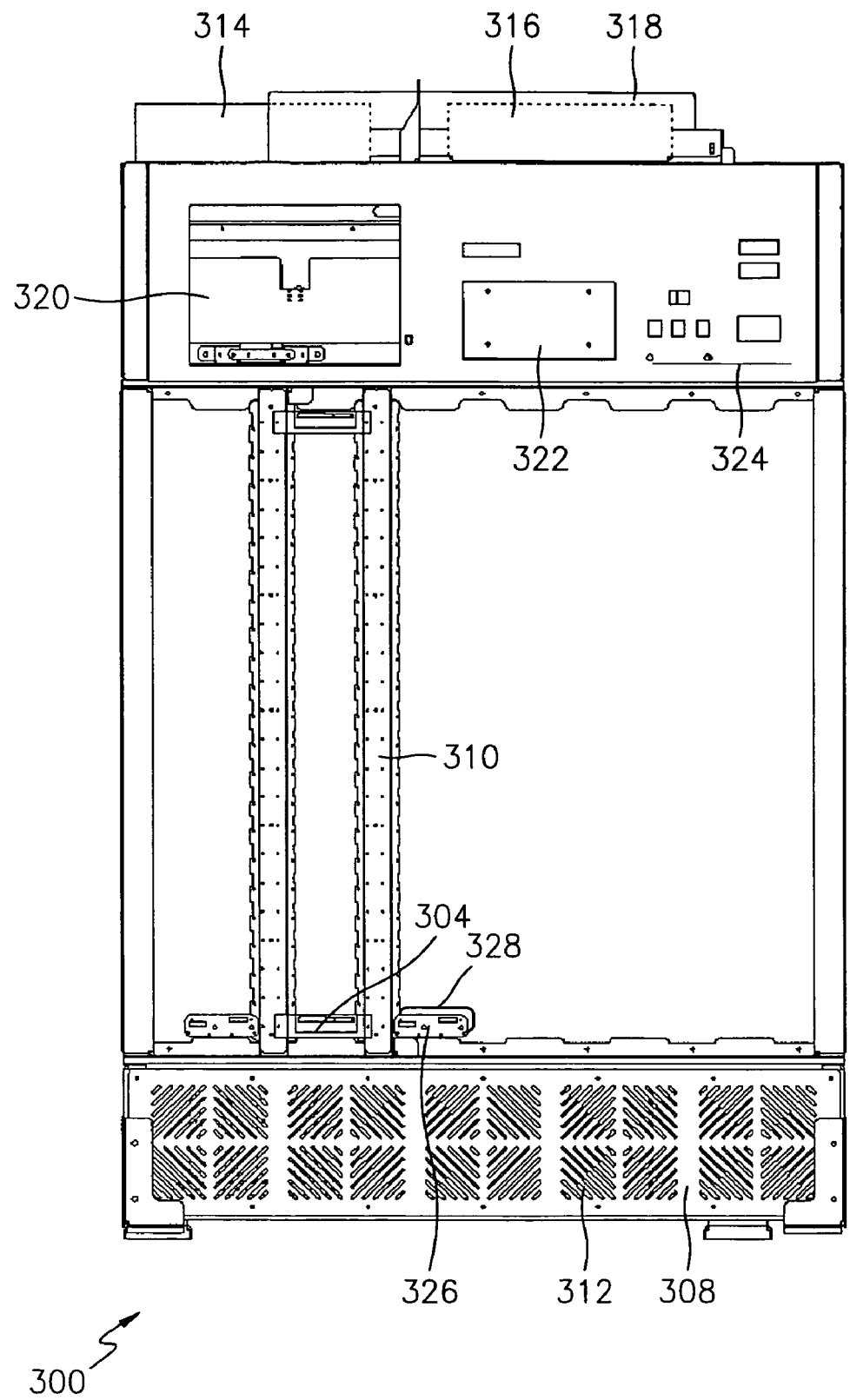
FIG. 5 is a rear view of the hard disk drive testing apparatus shown in FIGS. 3 and 4.

FIGS. 3 through 5 are a perspective view, a side view, and a rear view, respectively, of an HDD testing apparatus, according to an embodiment of the present invention. Referring to FIGS. 3 through 5, the HDD testing apparatus 300 comprises, in a center portion of the HDD testing apparatus 300, a burn-in chamber 302 where a plurality of HDDs can be stacked in a plurality of loading/unloading jigs 304 (only one loading/unloading jig 304 shown in drawings). LEDs on each loading/unloading jig 304 show a test status of the HDD loaded on that loading/unloading jig 304. At the rear side of the center portion of the HDD testing apparatus 300, PCB interface boards 328 (shown in FIGS. 5 and 7) are installed, which have RS-232 transmitters/receivers communicably connecting the HDDs to the PCB interface boards 328 by converting an RS-232 signal, that is, a test driver control signal, into an HDD TTL signal level and vice versa. The PCB interface boards 328 also have serial communication (RS-232) interface connectors to form a serial communication channel between the PCB interface boards 328 and a serial communication exchanger 316, and also have DC power supply connectors to connect to power cards 330 (shown in FIG. 7). The RS-232 signal lines, LED control signal lines, and power lines from an upper portion 306 and a lower portion 308 of the HDD testing apparatus 300 are connected to the corresponding interface connectors of each PCB interface board 328 along the rear of support ducts 310 (only one support duct 310 shown in drawings).

Typically, at the lower portion 308 of the HDD testing apparatus, an electricity board 334, a DC power supply 332 and the power cards 330 (all shown in FIG. 7) which control the supply of power to the HDDs and output a test driver status display LED control signal to the LEDs on the loading/unloading jigs 304, are installed inside a housing, and ventilation holes 312 are formed in the housing. A signal line of a host computer 314 which supplies a control signal for controlling the power cards 330 is connected to the power cards 330 through the serial communication exchanger 316 at the upper portion 306 of the HDD testing apparatus 300, and LED control signal lines and power supply lines from the power cards 330 are connected to the to the LEDs on the loading/unloading jigs 304 and the PCB interface boards 328 in the burn-in chamber 302, respectively. According to an aspect of the invention, a control signal line of the host computer 314 is connected to a PCB interface board 328 of an HDD through the serial communication exchanger 316.

Typically, the host computer 314, the serial communication exchanger 316, a power controller 360 (shown in FIG. 7 in more detail) that comprises an electricity board 334, a DC power supply 332, and power cards 330, and a fan(s) 318 that keeps the temperature of the HDDs being tested substantially constant at room temperature by removing heat generated by the HDDs from the burn-in chamber 302, are located at the upper portion 306 of the HDD testing apparatus 300. At the front of the upper portion 306, an interface unit 322 is installed, which, typically, comprises a display unit 320, and as input units, a keyboard, and a mouse, for an operator (user, control device) to interface with the host computer 314. Also located at the front of the upper portion 306 is a power display unit 324 that includes on/off switches for the DC power supplies, the host computer 314, and the fan(s) 318, and a power display window that displays the power status. Inside of the housing of the upper portion 306, another (upper) DC power supply 332, other power cards 330, and another electricity board 334 that supplies the operating signal to the upper DC power supply are installed. The inside of the upper portion 306 is much like the inside of the lower portion 308.

FIG. 4 is a side view of the hard disk drive testing apparatus 300 shown in FIG. 3. FIG. 5 is a rear view of the hard disk drive testing apparatus shown in FIGS. 3 and 4. Referring to FIGS. 4 and 5, in the HDD testing apparatus 300, two HDD testing apparatuses 300 can be combined by placing them back-to-back and can be separated for maintenance.

Figure 6:
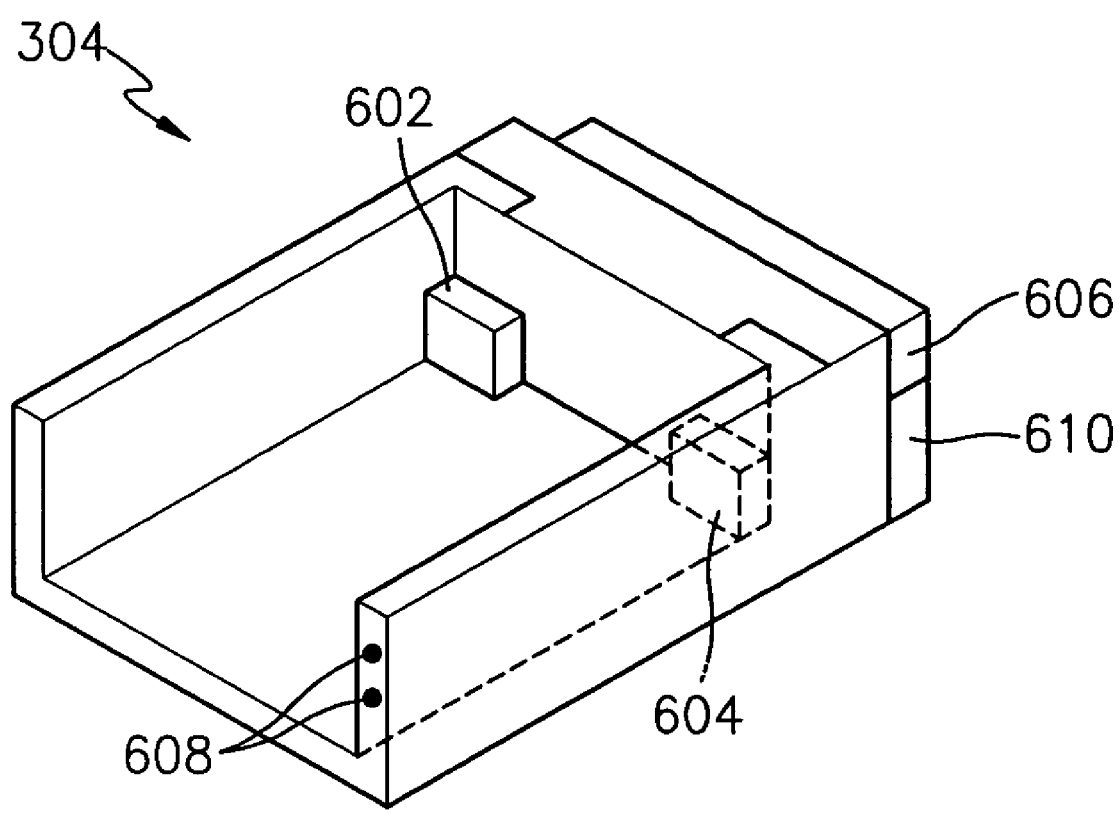
FIG. 6 is a perspective view of a loading/unloading jig shown in FIG. 3.

The operation of the hard disk drive testing apparatus 300 shown in FIGS. 3 through 5 is described in detail as follows. In the burn-in chamber 302, the loading/unloading jigs (i.e., HDD holders) 304 for loading/unloading the HDDs to be tested can be stacked lengthwise and widthwise (as the case may be) on the support ducts 310. FIG. 6 is a perspective view of a lengthwise loading/unloading jig 304, according to an embodiment of the present invention. As shown in FIG. 6, pogo pins 602 and 604 which connect power pins and two universal asynchronous receiver transmitter (UART) pins of an HDD are located at the inside of the loading/unloading jig 304, and a pogo pin connector 606 connected with the pogo pins 602 and 604 is located at the outside of the loading/unloading jig 304. The loading/unloading jig 304 is disclosed in Korean Patent Publication No. 1999-70583 (Sep. 15, 1999), Korean Patent Publication No. 1998-31599 (Jul. 25, 1998), and Korean Patent Publication No. 1998-47465 (Sep. 15, 1998).

The pogo pin connector 606 is connected to a PCB interface board 328 passing through a separating bar 326 (see FIG. 5) located at the rear of the burn-in chamber 302. The interface board 328 receives the control signal from the serial communication exchanger 316, converts the received control signal into a voltage level fitting an HDD (i.e., typically the TTL level signal), and supplies the converted received control signal to the pogo pin connector 606. In this way, the host computer 314 can communicate with the HDD.

With respect to the HDD testing apparatus 300 shown in FIG. 3, and the loading/unloading jig 304 diagram of FIG. 6, on a front (left) side of the loading/unloading jig 304, typically, two LEDs 608 are provided, each LED capable of emitting three different colors of light as a display of the status of the HDD placed in the loading/unloading jig 304. On the rear of the loading/unloading jig 304, an LED control signal line, which supplies a signal from the host computer 314 via a corresponding power card for controlling the two three-colored LEDs 608, is connected to a connector 610. In this way, the LEDs 608 are lighted corresponding to the test status of the HDD as determined by the host computer 314.

As described above, in each of the upper portion 306 and the lower portion 308 of the HDD testing apparatus 300, an electricity board 334 (shown in FIG. 7), a DC power supply 332 (shown in FIG. 7), and the power cards 330 are installed. The electricity board 334 is configured to start operation when the host computer 314 powers up, after main power is supplied to the HDD testing apparatus 300, and operates the DC power supply 332 upon receipt of DC power up instructions from the host computer 314 via the serial communication exchanger 316, and supplies a DC voltage level adjustment signal to the DC power supply 332. The power cards, a number of which typically corresponds to the number of HDDs that can be accommodated in the burning-chamber 302, are operated by power from the DC power supply, and then DC power is supplied to HDDs on each loading/unloading jig 304 via the corresponding power card 330.

The power card 330 judges whether an HDD is installed in a loading/unloading jig 304 by measuring a voltage through the power line connected to the interface board 328 in the burn-in chamber 302, and also can measure the supplied DC voltage. Typically, the power card 330 is connected to the host computer 314 via the serial communication exchanger 316, and, typically, sends information on the HDD loaded/unloaded status, the power supply status, and other information to the host computer 314, and executes instructions issued from the host computer 314 to control the LEDs 608 of the loading/unloading jig 304, and to turn on/off the supply of power to the HDD.

The host computer 314, which controls the entire HDD testing apparatus 300 and an HDD testing, controls each part of the HDD testing apparatus 300 via the serial communication exchanger 316. According to an aspect of the present invention, the host computer 314 controls an HDD and a power card 330 with a serial communication signal via the serial communication exchanger 316. Therefore, the serial communication exchanger 316 is in serial communication with the PCB interface boards 328 and the power cards 330. In particular, to communicably connect the host computer 314 and the HDD with the serial communication signal via the serial communication exchanger 316, a voltage level of the serial communication signal is changed when transmitting the serial communication signal from the serial communication exchanger 316 to the HDD via a PCB interface board 328, because typically the voltage levels used in the serial communication exchanger 316 and the TTL signal in the HDD are different. Meanwhile, the power card 330 controls the LEDs 608 installed in the loading/unloading jig 304 of the HDD in response to the control signal from the host computer 314. That is, signals transmitted to the PCB interface board 328 are comprised of control signals from the host computer 314 and LED control signals from the power card 330.

The display unit 320 on the front of the upper portion 306 of the HDD testing apparatus 300 is also connected to the host computer 314. Information enabling an operator to monitor the status of each test HDD is displayed on the display unit 320. The operator can execute a host program or a specified function of the host program via the interface unit 322, for example, a keyboard and a mouse.

On the power display unit 324, typically, a master power button which can turn on/off power to the entire HDD testing apparatus 300, a power button which turns the host computer 314 on/off, a power button which turns the DC power supplies installed in the upper portion 306 and in the lower portion 308 on/off, and a power button which turns the fan 318 on/off, are installed. Also, the status of power being supplied can be immediately confirmed on a screen of the power display unit 324.

As shown in FIG. 5, at the rear side of the HDD testing apparatus 300, the devices or equipment inside the HDD testing apparatus 300, like the signal lines and the interface boards 328 are exposed. However, the devices and equipment inside the HDD testing apparatus 300 can be covered up and protected without fitting a cover over the rear side of the apparatus by combining two HDD testing apparatuses 300 back-to-back, i.e., by matching up their rear sides. The fan 318 discharges heat generated by operation of the HDDs from the burn-in chamber 302 to the outside of the HDD testing apparatus 300.

Figure 7:
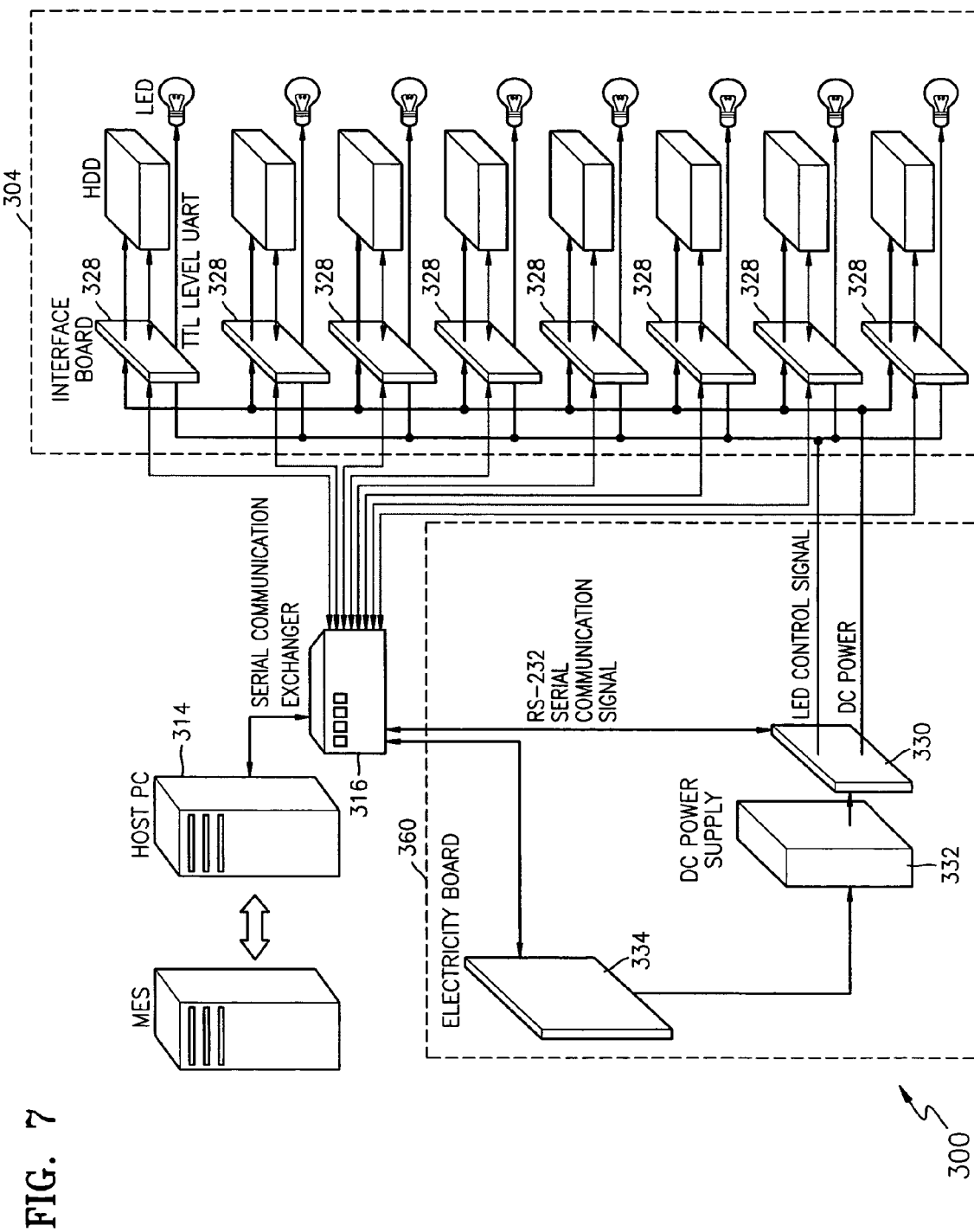
FIG. 7 is a diagram which schematically shows in more detail the internal/external functional configuration and operation of the hard disk testing apparatus shown in FIG. 3, according to an embodiment of the present invention.

FIG. 7 is a diagram which schematically shows in more detail the internal/external functional configuration and operation of the hard disk testing apparatus shown in FIG. 3, according to an embodiment of the present invention. The host computer 314 communicates with a process history database (MES) via a network, and is communicably connected, via the serial communication exchanger 316, with a plurality of HDDs, an electricity board 334, and a plurality of power cards 330, each power card controlling power and LED signals to a number of HDDs as determined by implementation environment, such as software/hardware constraints. In other words, typically, a maximum number of HDDs to be controlled varies according to software and not limited. According to an aspect of the invention, the serial communication exchanger 316 is communicably connectable to a power controller 360 and plurality of serial communication lines and control lines connectable to a plurality of loading/unloading jig(s) 304. In particular, the serial communication exchanger power controller 360 comprises the electricity board 334, the power cards 330, and the DC power supply 332. In FIG. 7, the host computer 314 is a standard computer and the serial communication exchanger 316 is a peripheral of the standard computer 314 that interfaces via serial communication the standard computer 314 with a plurality of HDDs for testing the HDDs. According to an aspect of the present invention as shown in FIGS. 3–5 and 7, the host computer 314, the serial communication exchanger 316, and the HDDs are all provided in one body in which the serial communication exchanger 316 interfaces via serial communication the standard computer 314 with a plurality of HDDs for testing the HDDs, however, the present invention is not limited to such an implementation configuration. Although in the above-described FIG. 7 example embodiment, the power controller 360 is implemented as a separate element from the serial communication exchanger 316 and communicably connectable with the serial communication exchanger 316, the present invention is not limited to such a configuration, and the power controller 360 may be configured to be part of the serial communication exchanger 316.

First, when the host computer 314 is booted, the host computer 314 executes the host program for testing the HDDs. The host computer 314 issues a DC power supply instruction to the electricity board 334 via the serial communication exchanger 316, according to the host program. When the DC power supply 332 starts to supply power under the control of the electricity board 334, the power cards 330 are operated, and the host computer 314 continuously checks the loaded/unloaded status of HDDs on the loading/unloading jigs 304 via each power card 330. At this time, the power cards 330 check the loaded/unloaded status of the HDDs, typically, by detecting a voltage drop on the power line connected to each HDD.

According to the FIG. 7 example, each power card 330 controls the DC power supply to each of 8 interface boards 328 for 8 HDDs, under the control of the host computer 314, and also controls the LEDs 608 of the loading/unloading jigs 304. If a new HDD is installed in a loading/unloading jig 304 and recognized by the corresponding power card 330, the host computer 314 immediately starts to communicate with the installed HDD via a serial communication channel established among the host computer 314, the serial communication exchanger 316 input serial port and one of the output serial ports, and an interface board 328 of the installed HDD. The host computer 314 gets driver information, for example, the interface standard, the model name, and the version information, from the HDD, transfers the driver information to the MES, downloads a test script and a test code appropriate for the HDD from the MES, transfers the test script and test code to the HDD, and starts testing the HDD. More particularly, upon loading of an HDD, information indicating an address of the loaded HDD is transmitted to the host computer 314 via the COM1 port of the host computer 314. According to an aspect of the invention, and with reference to FIG. 8, the COM1 port of the host computer 314 is for controlling the serial communication exchanger 316 (COM1: ROUTING), while COM2 port of the host computer 314 is for transmitting/receiving data (COM2: DATAPATH) from the serial communication exchanger 316, the power card 330, the electricity board 334, etc. That is, the information regarding the loaded HDD is transmitted to the COM2 port of the host computer 314 via the serial communication exchanger 316.

The host computer 314 displays the test status through the display unit 320, and issues instructions to the power card 330 for lighting the LEDs 608 on the loading/unloading jig 304. More particularly, when the HDD sends the test results to the host computer 314 after testing is completed, the host computer 314 issues instructions to the power card 330 to cut off power to the HDD, displays the test results through the display unit 320 and the LEDs 608 of the loading/unloading jig 304, and also transfers the test results to the MES.

FIG. 8 is a functional block diagram of an HDD testing apparatus, according to an embodiment of the present invention. In summary, FIG. 8 is a diagram identifying the typical functions of each component of the HDD test apparatus 300. Referring to FIG. 8, the host computer 314 communicates with an HDD via the second serial communication port (COM2) of the host computer 314 as a data path and the serial communication exchanger 316. If, for example, 144 HDDs are installed in the burn-in chamber 302, the serial communication exchanger 316 selectively communicably connects the second serial communication port (COM2) of the host computer 314 to each of the 144 HDDs, in response to installation of the HDDs.

More particularly, when the host computer 314 is connected with one of the HDDs by the serial communication exchanger 316, a serial communication channel is formed between the host computer 314 and the HDD for testing the HDD. The routing process of the serial communication exchanger 316 is performed according to channel exchange instructions supplied to the serial communication exchanger 316 via the first serial communication port (COM1) of the host computer 314 as the serial port routing path. More particularly, once a power card 330 detects installation of an HDD, the installed HDD route information (e.g., port number) is transmitted by the power card 330 to the host computer 314 via the serial communication exchanger 316 and the first serial communication port (COM1) of the host computer 314. Then, the host computer 314 controls the serial communication exchanger 315 via the first serial communication port COM1 of the host computer 314, to establish a serial communication channel between the host computer 314 and the installed HDD, via the serial communication port COM2 of the host computer 314 and one of the corresponding selected serial ports of the serial communication exchanger 316. Once the serial communication channel is formed between the host computer 314 and the HDD, via the serial communication port COM2 of the host computer 314 and one of the corresponding selected serial ports of the serial communication exchanger 316, the host computer 314 and the HDD can start and end serial information transmission, such as test result (pass, fail code) transmission from the HDD, the entire test process history check information transmission from the HDD, etc.

Therefore, the loaded/unloaded status of an HDD is detected by the power cards 330. Each power card 330 selectively supplies DC power generated by the DC power supply 332 to 8 HDDs and detects the loaded/unloaded status of each HDD by monitoring a voltage drop of the DC power supplied to the HDD. Also, according to an aspect of the invention, each power card 330 gathers and transfers to the host computer 314, information about the loaded/unloaded status of HDDs, if a request is issued from the host computer 314. On the other hand, each power card 330 controls the LEDs 608 on each loading/unloading jig 304 according to instructions from the host computer 314. The host computer 314 sends an LED control signal to the power card 330 to indicate each processing status of the HDD. The communication of information between the host computer 314 and the power card 330 is also performed via a serial communication channel, and the serial communication exchanger 316 forms the serial communication channel between the host computer 314 and the power card 330, if needed.

The electricity board 334 performs an initial operation of the HDD testing apparatus, that is, an operation that starts the DC power supply 332 and supplies DC power to each power card 330. Also, the electricity board 334 includes an alarm lamp which shows normal/error status of the HDD testing apparatus. The communication of information between the host computer 314 and the electricity board 334 is also performed via a serial communication channel, and the serial communication exchanger 316 forms the serial communication channel between the host computer 314 and the electricity board 334, if needed.

The host computer 314 provides functionality so that an operator perform an operation that checks the status of a serial port communicably connected to the HDD and the HDD test status and initiate (select) HDD tests (e.g., an appropriate script and code for the HDD) and confirm the HDD test results through the display unit 320 by performing, through the interface unit 322, via the serial port communication channel established by the serial communication exchanger 316 between the host computer 314 and the PCB interface board 328 of the HDD.

In the above-described HDD testing apparatus 300, for example, if one power card 330 can handle 8 HDDs, in a case of using 18 power cards 330, then one host computer 314 can concurrently test up to 144 HDDs by directly controlling the 144 HDDs, the electricity board 334, and the 18 power cards 330, through the serial communication ports COM1 and COM2 of the host computer 314. More particularly, in the above described HDD testing apparatus 300, one host computer 314 can concurrently test a plurality of HDDs by directly controlling the HDDs, the electricity board 334, and a plurality of power cards 330 through establishment of a serial communication channel via the serial communication ports COM1 and COM2 of the host computer 314, among the host computer 314, the serial communication exchanger 316, the PCB interface boards 328 of the HDD and the UART port of the HDD. Therefore, the HDD testing apparatus 300 can test numerous HDDs at the same time, while occupying less space and costing less than the conventional HDD testing apparatuses. The present invention provides a simple and clear HDD testing computer system in which the host computer 314 controls a plurality of HDDs, the power cards 330, and the electricity board 334, through a serial communication port by the same (i.e., one) communication method. Thus, in the HDD testing apparatus 300, the test process can be changed easily, maintenance of the HDD testing apparatus 300 is easy, and test reliability is high. Also, the HDD testing apparatus 300 tests HDDs with a UART port which is supportable by all of the HDDs, and thus alleviates the need to invest in additional equipment for the HDD testing apparatus 300 to accommodate any future changes in HDD interface standard.

As described above, the HDD testing apparatus 300 reduces equipment cost, because no additional test computers are needed and the host computer controls and tests HDDs directly. The HDD testing apparatus of the present invention further reduces equipment cost, because by testing the HDDs through their standard UART ports, no additional IDE interfaces are required and HDDs are controlled by using the serial communication port of the host computer and the serial communication port of the HDD. Also, the HDD testing apparatus of the present invention can minimize necessary investment in equipment modification, because it operates regardless of an HDD interface standard used to interface with a main board of the computer. Moreover, because the HDD testing apparatus of the present invention uses the universal serial communication method, it is easy for a software engineer to produce and improve a test program without specific training, and maintenance of the HDD testing apparatus is conveniently performed.

Further, the HDD testing apparatus of the present invention needs no additional space for a control chamber to accommodate multiple test computers, makes highly efficient use of space, and further reduces cost, when two apparatuses are combined back-to-back. In case of the back-to-back HDD testing apparatus configuration, the rear sides of two HDD testing apparatuses 300 are put together and no structure to cover the rear of the HDD testing apparatuses 300 is necessary. In addition, the HDD testing apparatus of the present invention further reduces equipment cost and size, because it does not utilize a heater and blower, but it instead tests HDD reliability at a normal room temperature by expelling hot air from inside the HDD testing apparatus 300 and the temperature inside the burn-in chamber 302 is estimated to be room temperature, that is, about 20 Celsius. The HDD testing apparatus 300 is implemented in computing software and/or computing hardware.

Therefore, the present invention provides a hard disk drive (HDD) testing apparatus using one host computer to test a plurality of HDDs and a method thereof. Typically, the test is an HDD burn-in test process, but the present invention is not limited to such a configuration, and any HDD testing process can be performed. A host computer having at least two serial communication ports is communicably connected to power cards which supply operating power to each HDD to be tested. A serial communication exchanger is communicably connected to the serial communication ports of the host computer and to the HDDs, and responds to channel selection instructions issued by the host computer to selectively establish a serial communication channel among HDDs, the power card, and the host computer, thereby allowing the single host computer to test the HDDs by communicating with the HDDs via the established serial communication channel. More particularly, the present invention provides a hard disk drive (HDD) testing apparatus, comprising a single host computer having first and second serial communication ports; a plurality of HDDs with serial ports; and a multi-port serial communication switch with circuitry communicably connectable to the first serial communication port of the computer to establish a serial port selection channel according to the computer control to selectively establish a serial communication channel between the second serial communication port of the computer and one of a plurality of input/output serial ports of the switch connected to the serial ports of the HDDs. The host computer tests the HDDs by communicating with the HDDs via the established serial communication channel. A plurality of loading/unloading jigs onto which the HDDs are loaded and unloaded are provided and a power controller connected via control lines to the loading/unloading jigs, supplies power to the HDDs according to the host computer. In the above-described embodiments, testing of a hard disk drive is used as an example, and the present invention is not limited to such a configuration and can be applied to test by a single computer any plurality of devices with serial ports.

More particularly, the present invention provides a hard disk drive (HDD) testing apparatus, comprising a plurality of HDDs; and a single host computer directly testing each HDD regardless of each HDD interface standard with the single host computer via selectively established communication channels between the single host computer and each HDD. According to an aspect of the invention, the HDDs each have a standard universal asynchronous receiver transmitter (UART) port, and the single host computer has one serial communication port and directly tests each HDD via selectively established serial communication channels between the one serial communication port of the single host computer and each HDD standard UART port. According to another aspect of the invention, the single host computer has first and second serial communication ports, and the apparatus further comprises a multi-port serial communication switch with circuitry communicably connectable to the first and second serial communication ports of the single host computer to establish a serial port selection channel according to the single host computer to selectively establish the serial communication channel between the second serial communication port of the single host computer and one of a plurality of input/output serial ports of the switch connected to the serial ports of the HDDs. According to another aspect of the invention, the apparatus further comprises a plurality of loading/unloading jigs onto which the HDDs are loaded and unloaded; and a power controller connected via control lines to the loading/unloading jigs and supplying power to the HDDs according to the single host computer, detecting an HDD loading, and transmitting an HDD loading status to the single host computer to selectively establish the serial communication between the loaded HDD and the single host computer for the test. According to another aspect of the invention, the apparatus further comprises a rectangular burn-in chamber having a front side and rear side, and receiving the plurality of HDDs arranged in a stack, wherein the burn-in chamber rear side is combinable with a rear side of a burn-in chamber of another HDD testing apparatus, thereby providing one double-sided HDD testing apparatus. According to another aspect of the invention, the apparatus further comprises a burn-in chamber receiving the plurality of HDDs, and a fan expelling heat from the HDDs themselves in the burn-in chamber to maintain a room temperature burn-in chamber temperature, thereby testing temperature reliability of the HDDs.

Also another method of testing hard disks using the hard disk drive testing apparatus 300 for testing a plurality of hard disk drives using only one host computer, without using test computers, is disclosed in the related Korean Patent Application No. 2003-30893 filed May 15, 2003 by Samsung Electronics Co., Ltd., assignee of the present Application, and also disclosed in a co-pending US patent application filed by Samsung Electronics Co., Ltd., assignee of the present Application, on May 14, 2004 in the US Patent and Trademark Office and having an, the entire contents of which are hereby incorporated by reference.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:
1. A hard disk drive (HDD) testing apparatus, comprising:
   a host computer having at least two serial communication ports;
   a power card which selectively supplies operating power to each of a plurality of HDDs to be tested according to the host computer; and
   a serial communication exchanger connected to the at least two serial communication ports of the host computer, which responds to channel selection instructions issued by the host computer via one of the serial communication ports, and selectively establishes a serial communication channel among the HDDs, and the host computer, wherein the host computer tests the HDDs by communicating with the HDDs via the established serial communication channel.

2. The hard disk drive (HDD) testing apparatus of claim 1, further comprising:
a loading/unloading jig onto which one of the HDDs as an HDD is loaded for testing and unloaded after the testing, the loading/unloading jig having a connector which channels the operating power supplied from the power card to the loaded HDD and connects a serial communication port of the loaded HDD to the serial communication exchanger via the established serial communication channel.

3. The hard disk drive (HDD) testing apparatus of claim 2, wherein the power card detects whether one of the HDDs is loaded in the loading/unloading jig and transmits an HDD load result to the host computer.

4. The hard disk drive (HDD) testing apparatus of claim 2, further comprising light emitting diodes (LEDs) installed on the loading/unloading jig and controlled by the power card in response to an LED control signal supplied from the host computer, to show a test status and progress of the testing of the loaded HDD.

5. The hard disk drive (HDD) testing apparatus of claim 2, further comprising: an interface board disposed between the serial communication exchanger and the connector of the loading/unloading jig adjusts a level of serial communication signals transmitted between the serial communication exchanger and the loaded HDD on the established serial communication channel.

6. The hard disk drive (HDD) testing apparatus of claim 1, further comprising:
a DC power supply supplying the HDD operating power to the power card to selectively supply the HDD operating power to each of the plurality of HDDs to be tested; and
an electricity board in communication with the host computer at initial operation time of the apparatus and starting the DC power supply according to the host computer.

7. The hard disk drive (HDD) testing apparatus of claim 6, wherein the electricity board controls an alarm lamp showing a normal/error status of the apparatus, according to the host computer.

8. A hard disk drive (HDD) testing apparatus, comprising:
a burn-in chamber where a plurality of HDDs are stacked;
a host computer which communicates with and performs a test on the HDDs stacked in the burn-in chamber; and
a serial communication exchanger which establishes a serial communication channel between each HDD and the host computer, according to the host computer.

9. The hard disk drive (HDD) testing apparatus of claim 8, further comprising:
an interface board attached to a rear side of the burn-in chamber and supplying a serial communication signal of the established serial communication channel and operating power to the HDDs.

10. The hard disk drive (HDD) testing apparatus of claim 9, wherein the interface board adjusts a level of a control signal transmitted between the serial communication exchanger and the HDD via the established serial communication channel.

11. The hard disk drive (HDD) testing apparatus of claim 8, further comprising:
a loading/unloading jig onto which one of the HDDs as an HDD is loaded for testing and unloaded after the testing, the loading/unloading jig having a connector connecting a serial communication port of the loaded HDD to the serial communication exchanger as the established serial communication channel.

12. The hard disk drive (HDD) testing apparatus of claim 11, further comprising: a power card supplies operating power to the HDDs, and the power card detects whether one of the HDDs is loaded on the loading/unloading jig and transfers an HDD load result to the host computer.

13. The hard disk drive (HDD) testing apparatus of claim 12, further comprising light emitting diodes (LEDs) installed on the loading/unloading jig and controlled by the power card in response to an LED control signal supplied from the host computer, to show a test status and progress of the testing of the loaded HDD.

14. A hard disk drive (HDD) testing apparatus, comprising:
a plurality of loadable and unloadable HDDs; and
a single host computer directly testing each loaded HDD regardless of each HDD interface standard with the single host computer via selectively established communication channels between the single host computer and each HDD,
wherein the HDDs each have a standard universal asynchronous receiver transmitter (UART) port, and
wherein the single host computer has one serial communication port and directly tests each HDD via selectively established serial communication channels between the one serial communication port of the single host computer and each HDD standard UART port.

15. The apparatus of claim 14, wherein the single host computer has the one serial communication port as a first serial communication port and a second serial communication port, and the apparatus further comprises:
a multi-port serial communication switch with circuitry communicably connectable to the first and second serial communication ports of the single host computer to establish a serial port selection channel according to the single host computer to selectively establish the serial communication channel between the second serial communication port of the single host computer and one of a plurality of input/output serial ports of the switch connected to the serial ports of the HDDs.

16. The apparatus of claim 14, further comprising:
a plurality of loading/unloading jigs onto which the HDDs are loaded and unloaded; and
a power controller connected via control lines to the loading/unloading jigs and supplying power to the HDDs according to the single host computer, detecting an HDD loading, and transmitting an HDD loading status to the single host computer to selectively establish the serial communication between the loaded HDD and the single host computer for the test.

17. The apparatus of claim 14, further comprising a rectangular burn-in chamber having a front side and rear side, and receiving the plurality of HDDs arranged in a stack, wherein the burn-in chamber rear side is combinable with a rear side of a burn-in chamber of another HDD testing apparatus, thereby providing one double-sided HDD testing apparatus.

18. A device testing apparatus, comprising:
a single host computer having first and second serial communication ports;
a plurality of devices with serial ports; and
a multi-port serial communication switch with circuitry communicably connectable to the first and second serial communication ports of the single host computer to establish a serial port selection channel according to the single host computer to selectively establish a serial communication channel between the second serial communication port of the single host computer and one of a plurality of input/output serial ports of the switch connected to the serial ports of the devices, wherein the single host computer tests each device by communicating with the each device via the selectively established serial communication channel.

19. A method, comprising:

establishing a serial port selection channel between a first serial communication port of a single host computer and a first port of a serial communication exchanger;

selectively establishing a serial data channel among a second serial communication port of the single host computer, a second port of the serial communication exchanger, one of a plurality of input/output serial ports of the serial communication exchanger and one of a plurality of loaded hard disk drives (HDDs) to be tested, according to serial port selection signals from the serial port selection channel in response to loading of the HDDs.

20. The method of claim 19, further comprising:

transmitting loaded HDD route information to the single host computer via the serial port selection channel, in response to the loading of the HDDs; and transmitting the serial port selection signals to the serial communication exchanger via the serial port selection channel, according to the loaded HDD route information.

* * * * *